US006910070B1

(12) United States Patent
Mishra et al.

(10) Patent No.: US 6,910,070 B1
(45) Date of Patent: Jun. 21, 2005

(54) METHODS AND SYSTEMS FOR ASYNCHRONOUS NOTIFICATION OF DATABASE EVENTS

(75) Inventors: Shailendra K. Mishra, Fremont, CA (US); Lakshminarayanan Chidambaran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/490,377

(22) Filed: Jan. 24, 2000

(51) Int. Cl.[7] .............................................. G06F 13/00
(52) U.S. Cl. ...................... 709/224; 709/227; 709/231; 707/201; 707/223
(58) Field of Search ................................ 709/224, 226, 709/223, 231, 203, 217, 218, 220, 225, 235, 2; 707/201, 203, 223; 370/229, 13, 397

(56) References Cited

U.S. PATENT DOCUMENTS

| | | | | |
|---|---|---|---|---|
| 6,012,095 A | * | 1/2000 | Thompson et al. | 709/231 |
| 6,088,737 A | * | 7/2000 | Yano et al. | 709/235 |
| 6,092,102 A | * | 7/2000 | Wagner | 340/7.29 |
| 6,167,448 A | * | 12/2000 | Hemphill et al. | 709/224 |
| 6,189,038 B1 | * | 2/2001 | Thompson et al. | 709/231 |
| 6,343,320 B1 | * | 1/2002 | Fairchild et al. | 709/224 |
| 6,505,244 B1 | * | 1/2003 | Natarajan et al. | 709/223 |
| 6,539,427 B1 | * | 3/2003 | Natarajan et al. | 709/224 |

OTHER PUBLICATIONS

WorkWise.com World Wide Web Site: "*Pioneering Software Solutions for Application Integration*", pp. 1–3, http://www.workwise.com/Company.asp, 1999.
WorkWise.com World Wide Web Site: "*WorkWise Business Alerts 2.1: Monitoring Changing Business Conditions to Create A More Responsive Organization*", pp. 1–3, http://www.workwise.com/Business%20Alerts.asp, 1999.
WorkWise.com World Wide Web Site: "*WorkWise Data Agent Server 2.0: Integrating Data And Automating Tasks Across Independent Applications*", pp. 1–3, http://www.workwise.com/DAS.asp, 1999.
WorkWise.com World Wide Web Site: "*Integrated Applications: Managing Information Across Multiple Databases*", pp. 1–2, http://www.workwise.com/Integrated%20Applications.asp, 1999.
WorkWise.com World Wide Web Site: "*Built–In Programming: Programming Power With Point–And–Click Ease*", pp. 1–2, http://www.workwise.com/Built%20in%20Programming.asp, 1999.

(Continued)

*Primary Examiner*—Patrice Winder
*Assistant Examiner*—Khanh Quang Dinh
(74) *Attorney, Agent, or Firm*—Young Law Firm, P.C.

(57) ABSTRACT

A method for asynchronously notifying an application client of a system or data event of interest within a database includes steps of receiving a subscription to an event name from a logical agent, the event name corresponding to the event of interest, and receiving a registration from the application client, the registration including delivery information indicating at least where and how a notification concerning the event is to be delivered. The occurrence of the event is then detected within the database, whereupon the notification of the detected event is published to a data structure referenced by the event name. The delivery information is then retrieved and the published notification is formatted according to the retrieved delivery information. The formatted notification is then asynchronously delivered to the application client over a network, such as the Internet. The application client may specify a rule, the satisfaction of which is a precondition to the delivery of the notification. The application client, in this manner, receives only the notification for which it has subscribed and receives the notifications substantially contemporaneously with the occurrence of the system or data event.

42 Claims, 4 Drawing Sheets

OTHER PUBLICATIONS

WorkWise.com World Wide Web Site: "*Immediate Process Improvement: Streamlined Processes Without Re–Engineering Headaches*", pp. 1–2, http://www.workwise.com/Process%20Improvement.asp, 1999.

WorkWise.com World Wide Web Site: "*Smart agents: Plug–In Modules That Take Care of Business*", pp. 1–3, http:///www.workwise.com/Smart%20Agents.asp, 1999.

WorkWise.com World Wide Web Site: "*Expert Agents: Programming Flexibility For Those Who Want It*", pp. 1–2, http:///www.workwise.com/Expert%20Agents.asp, 1999.

WorkWise.com World Wide Web Site: "*Improving Customer Service With Timely Communication*", pp. 1–2, http://www.workwise.com/BAService.asp, 1999.

WorkWise.com World Wide Web Site: "*The WorkWise Solution—An Email Based Alternative*", pp. 1–3, http://workwise.com/BASolutions.asp, 1999.

\* cited by examiner

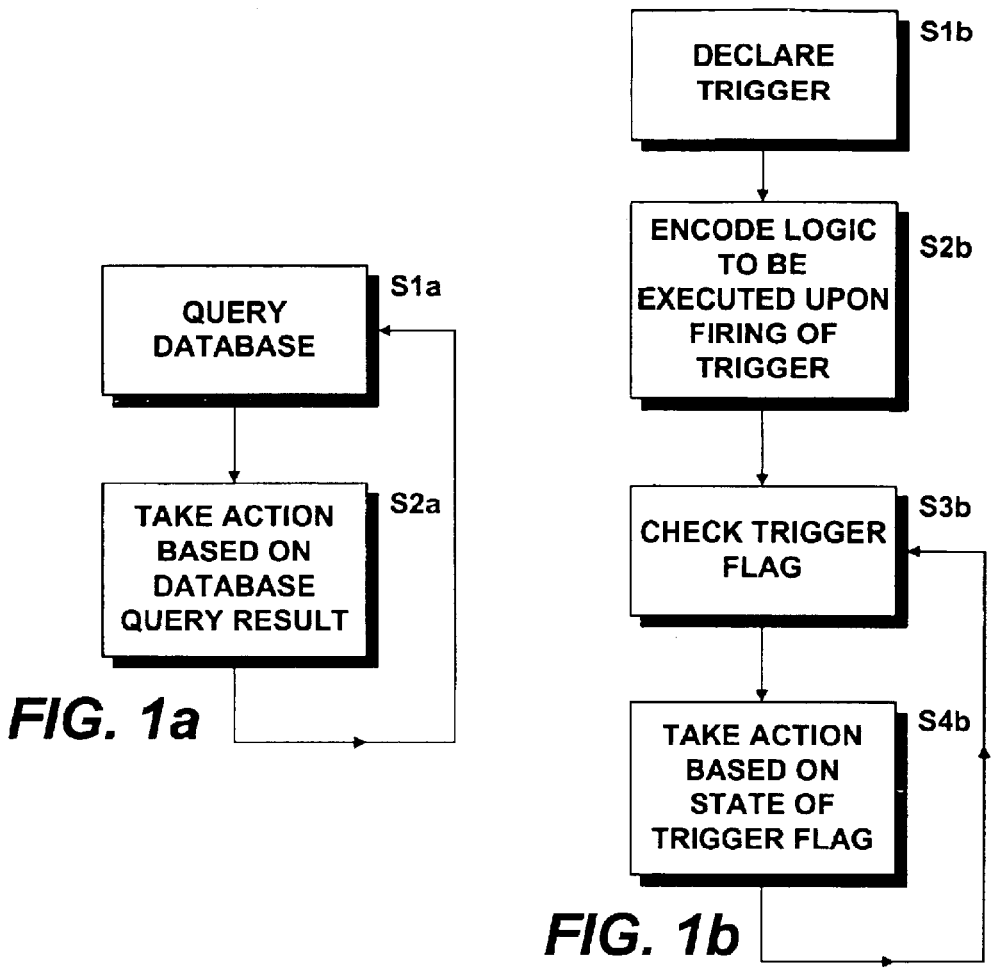
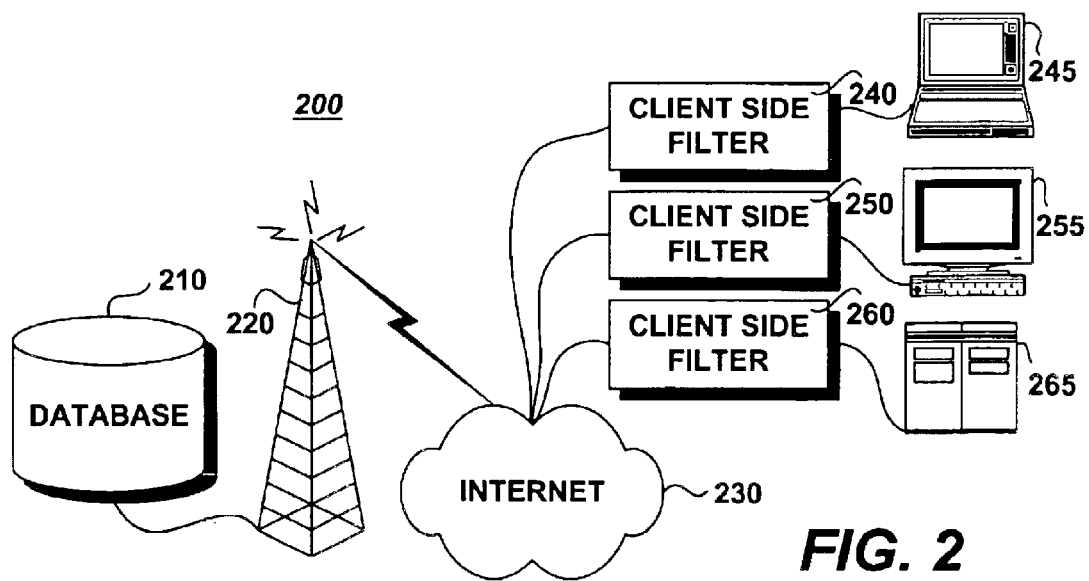

ered different data and information therefrom. Users and/or programs that must access the database often have an interest in events within the computerized database system itself (hereafter, "system events") or in the data that is resident in the database system (hereafter, "data events"). An event, within the context of the present invention, denotes a significant change of some sort. The change may be in the system state or configuration or in any other parameter of interest. Users of systems are typically interested in knowing about and acting on any changes of significance that takes places in the system that might potentially affect them.

METHODS AND SYSTEMS FOR ASYNCHRONOUS NOTIFICATION OF DATABASE EVENTS

BACKGROUND OF THE INVENTION

1. Field of the Invention

This invention relates to methods and systems to notify system users and/or applications of changes to the state of a computer system and/or to the data residing within the system. More particularly, the present invention relates to computer-implemented methods and systems to notify database users and/or applications of events within the database data or to the database system itself.

2. Description of the Related Art

Databases typically constitute the entire repository of information in an enterprise. As such, databases have become an integral and vital part of corporate infrastructure, storing data relating to virtually every aspect of a company's logical and physical structure, including organization, human resources, product lines, customers and financial information, for example. Such a database may be accessed by a variety of entities (including the database administrator, the company's employees, outside suppliers and/or computer programs both within and without the company), each such entity typically retrieving diff For example, users and/or programs accessing the database may want to be notified upon the occurrence of specified systems events, such as whether the database is about to shutdown or startup, is running out of disk space or rollback segments or upon the occurrence of logons and logoffs, for example. Likewise, inventory managers, for example may want to be notified upon the occurrence of specified data events, such as when the inventory for a specific part falls below a critical threshold, so that additional parts can be ordered in a timely manner. In each case, some action may be taken based upon such system- or data-related information extracted or otherwise obtained from the database.

The extraction of such information from a database may be carried out, for example, by carrying out the steps outlined in FIGS. 1a or 1b. As shown in FIG. 1a, the interested user may query the database (step S1a) and may take some action based upon the database query result (step S2a). For example, the database query may include a number of Structured Query Language (SQL) or Procedural Language/Structure Query Language (PL/SQL) statements that may ascertain the status of one or more tables within the database. This sequence may then be repeated, for example, until the database query reveals that the event of interest has occurred. Such a repetitive cycle, however, is believed to be inefficient, wasteful and time consuming. Another method of obtaining information relative to events of interest within a database is shown in FIG. 1b. To notify a user of the occurrence of an event, a trigger may be declared, as shown in step S1b. A trigger is a procedure that is implicitly executed when, for example, certain Data Manipulation Language (DML) statements (such as INSERT, UPDATE or DELETE, for example) are issued against an associated table in the database, as disclosed, for example, in Chapter 17 of *Oracle8 Server Concepts*, release 8.0 © 1997 Oracle Corporation (or later versions thereof), which publication is incorporated herein by reference in its entirety. The trigger, as shown at step S2b, may include logic, such as SQL or PL/SQL statements that are executed when one of the aforementioned statements are issued against the table or tables of interest. Thereafter, another application may check a trigger flag (step S3b) that is updated by the trigger declared in step S1b and a still further application may take appropriate action based upon the state of the trigger flag, as shown at step S4b. Again, the user is not notified that the event of interest occurred until some outward manifestation of the event is apparent of until a check of the trigger flag reveals that the state thereof has changed. The user may have to repeatedly check the state of the trigger flag to ascertain whether is has changed state. This cyclic polling process is also believed to be inherently inefficient, wasteful of database resources and time consuming. Such a database request—reply synchronous process forces the user to "pull" the specific information of interest from the database by issuing a request therefor, even through the events of interest most often occur asynchronously. FIGS. 1a and 1b assume that the user (whether system administrator, database user or application) is tightly integrated with the database. For example, the user in the examples of FIGS. 1a and 1b may be required to log onto the database to query the database and/or to code the appropriate trigger.

FIG. 2 shows another paradigm in database event notification. Indeed, FIG. 2 shows an example of retrieving information from a database wherein the database "pushes" information from the database to a number of loosely coupled users. As depicted therein, the contents of a database 210 (or a selected portion thereof) are pushed or broadcast (as symbolized by the broadcast antenna tower 220), to the Internet 230 and/or across another communications channel. A number of clients, such as shown at 245, 255 and 265 filter the pushed database contents through corresponding client-side filters 240, 250 and 260 coupled between the Internet 230 and the clients 245, 255 and 265. Assuming, for example, that the database 210 is or includes a repository of news information, a large amount of information may be continually and indiscriminately pushed or broadcast through the Internet 230 to clients 245, 255 and 265 using the service. However, client 245 may only be interested in receiving a small portion of the pushed news information. For example, client 245 may only be interested in basketball information. More specifically, client 245 may one be interested in information directly relating to the Boston Celtics, for example. In that case, the client-side filter 240 may be caused to filter out any information relating to the Boston Celtics (using specified keywords, for example) from the stream of information pushed by database 210, to deliver only Celtics news to the client 245. Similarly, client 255 might be running an automated stock trading program, configured to purchase a specific stock (e.g. XYZ Corp.) when a predetermined combination of market conditions exist (e.g., when XYZ trades for under $20 and ABC Corp. trades for over $55). However, the system 200 of FIG. 2 is not equipped to selectively push data relating only to the share price of XYZ and ABC corporations directly to client 265, but only to aim a great flow of information, fire hose-like, toward the clients 245, 255 and 265. In effect, the client 265 is inundated with a great deal of information of which it has no interest and may have to receive the entire stock ticker in order to extract therefrom the information of interest. Such a flood of unwanted information needlessly consumes bandwidth and may clog corporate Intranets. This problem is exacerbated by the fact that the database 210 typically pushes it information out at regular intervals, irrespective of whether the information of interest to the clients 245, 255 or 265 has been updated since the last push, thereby often pushing duplicative and extraneous information onto the Internet and ultimately to the clients 245, 255 or 265. Because of its inherent limitations, the paradigm of FIG. 2 has largely been abandoned, although no suitable alternative is believed to have emerged in its stead.

What are needed, therefore, are methods and systems to notify users of database systems of interesting changes to the database system or data that is efficient and economical in terms of bandwidth, time and effort. In particular, what are needed are methods and systems allowing the detection of system and data events, as well as the publication and delivery of notifications thereof only to those clients having expressed an interest therein. Moreover, what are needed are methods and systems that deliver only those notifications of specific interest to each client. Such methods and systems, optimally, should asynchronously publish and deliver the notifications of systems and data events of interest to the clients, the publication and delivery thereby closely matching the manner in which the events occur and are detected.

SUMMARY OF THE INVENTION

It is an object of the present invention, therefore, to provide methods and systems to efficiently notify users of database systems of interesting changes to the database system or data. It is a further object of the present invention to provide methods and systems to detect system and data events and to publish and deliver notifications thereof only to those clients having expressed an interest therein. It is also an object of the prevent invention to provide methods and systems to asynchronously publish and deliver notifications of system and data events of interest to the clients, the publication and delivery thereby closely matching the manner in which the events occur and are detected.

In accordance, with the above-described objects and those that will be mentioned and will become apparent below, a computer implemented method of asynchronously notifying an application client of an event of interest within a database may include steps of receiving a subscription to an event name from a logical agent, the event name corresponding to the vent of interest and receiving a registration from the application client, the registration including delivery information indicating at least where and how a notification concerning the event is to be delivered. The occurrence of the event may then be detected within the database and the associated notification may be published to a data structure referenced by the event name upon detecting the occurrence of the event. The delivery information may then be retrieved and the published notification may then be formatted according to the retrieved delivery information. The formatted notification may then be delivered asynchronously to the application client over a network, such as the Internet.

BRIEF DESCRIPTION OF THE DRAWINGS

For a further understanding of the objects and advantages of the present invention, reference should be made to the following detailed description, taken in conjunction with the accompanying figures, in which:

FIG. 1a is a flowchart of a first method to synchronously extract information relative to an asynchronous event of interest from a database.

FIG. 1b is a flowchart of a second method to synchronously extract information relative to an asynchronous event of interest from a database.

FIG. 2 shows an example of retrieving information from a database wherein the database "pushes" information from the database to a number of loosely-coupled users, according to an embodiment of the present invention.

DESCRIPTION OF THE PREFERRED EMBODIMENTS

FUNCTIONAL OVERVIEW

The present invention is drawn to methods and systems for asynchronous notification of client specified data and system events. In the case of system events, for example, timely and asynchronous receipt of system event notifications allows client applications to smoothly transition on and off-line without having to repeatedly poll the database or handle abrupt errors. The detection and publication of system events such as logon and logoff may be used for auditing or other purposes. Data events, according to the present invention, may be delivered asynchronously without any substantial loss to transaction throughput.

To achieve these objectives, the present invention implements methods and systems for the registration, detection, publication and delivery of both system and data events. To insure that clients (be they physical users or applications) receive only the narrowly tailored information that is of interest to them, each client, according to an embodiment of the present invention, may register an interest in receiving notifications regarding one or more data and/or system events. Thereafter, whenever one of these system or data events occurs, only those clients having registered an interest in the event receive a corresponding notification.

Figure 3:
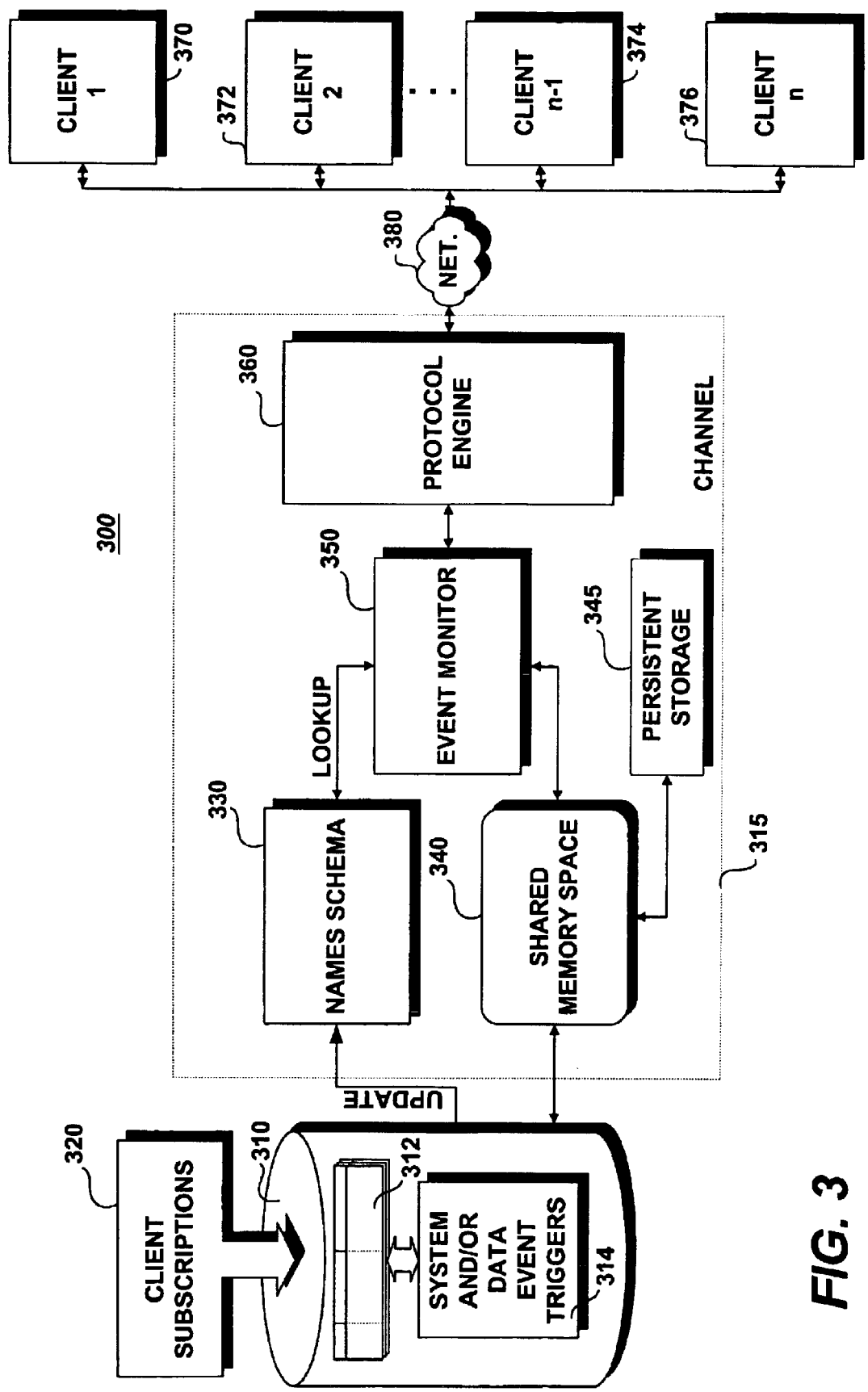
FIG. 3 is a block diagram of a system for asynchronous event notification, according to an embodiment of the present invention.

FIG. 3 is a block diagram of a system for asynchronous event notification, according to an embodiment of the present invention. The major components of the asynchronous database event notification system according to the present invention include a database 310 (an instance thereof), a channel 315 and a plurality of notification clients 370, 372, 374 and 376. The database 310 may be thought of as a supplier of event notifications and each of the plurality of clients 370, 372, 374 and 376 may be thought of as a consumer of such event notifications. Each of the clients 370, 372, 374 and 376 may be coupled to the database 310 through the channel 315 via a network 380 that may include, for example, the Internet, a leased line and/or some other public, private or hybrid network.

The present invention, according to one embodiment thereof, implements a push-push model of delivering event notifications from notification supplier (the database 310) to the notification consumers (clients 370, 372, 374 and/or 376). Indeed, according to an embodiment of the present invention, data or system event notifications are asynchronously pushed to the channel 315, whereupon the channel 315 selectively pushes the notifications to the notification clients 370, 372, 374 and/or 376. Other event notification models may also be implemented within the context of the present invention; namely, pull-pull, pull-push, or push-pull. The present invention will hereafter be described in terms of the push-push model, it being understood that the other aforementioned event notification models may also readily be implemented.

According to the present invention, the database 310 receives subscriptions 320 from the notification clients 370, 372, 374 and/or 376. Each of the notification clients 370, 372, 374 and/or 376 may subscribe to be notified upon the occurrence of one or more data or system events. To promote the loosely coupled nature of the subscription process, the clients 370, 372, 374 and/or 376 themselves, according to an embodiment of the present invention, do not subscribe to receive particular notifications. Rather, a logical entity termed an agent expresses an interest in receiving notification upon the occurrence of a specified event by way of a subscription. More particularly still, an agent, acting on behalf of one of the clients 370, 372, 374 and/or 376 subscribes to one or more event names. Each event name identifies a particular data or system event within the database 310. According to the present invention, all subscription 320 in the system for asynchronous event notification 300 "belong" to an agent and an agent may have multiple subscriptions 320. The database 310, therefore, has no knowledge of the clients 370, 372, 374 and/or 376, as all the database 310 has received are subscriptions 320 to particular event names from agents acting on behalf of one or more clients 370, 372, 374 and/or 376.

After receiving the subscriptions 320, the database 310 updates a logical entity termed a names schema 330. The names schema 330 stores the delivery information that specifies to which client(s) 370, 372, 374 and/or 376 the notification is to be delivered and how the notification is to be sent. The updating of the names schema 330, according to the present invention, is termed the registration process. The delivery information stored in the names schema 330 includes information as to where the notification is to be sent and how the notification is to be sent. For example, the delivery information provided by a particular client 370, 372, 374 or 376 may include an identification of the client process' host and port (where) and may include a callback indicating the manner in which delivery of the notification should be made (how). The registration process, therefore, associates a subscription 320 with a physical, potentially transient client 370, 372, 374 and/or 376. Should the client (process) clients 370, 372, 374 and/or 376 die and thereafter be invoked again, the re-invoked client process clients 370, 372, 374 and/or 376 preferably must again register its delivery information in the names schema 330. This is akin to a newspaper subscriber (the client 370, 372, 374 and/or 376) moving his or her residence (host/port) and calling the newspaper circulation department (names schema 330) to advise them of a new delivery address.

A data or system event, according to the present invention, may be detected by means of triggers, collectively shown in FIG. 3 at reference 314. The triggers 314 may include a stored procedure of (for example, SQL) triggering statements that are fired upon the occurrence of a data or system event. The triggers 314 are predefined database functions that are invoked on, database operations on a subset of database entities. Finally, a procedure or procedure (a PL/SQL block, for example) may be executed within the trigger body when the corresponding triggering statement is fired and the triggering restriction evaluates to TRUE. For example, a triggering data event may be related to an INSERT, DELETE, or UPDATE statement operating on one or more of the tables 312 within the database 310. Alternatively, a triggering system event may be related to systems-level database server events, such as logons, logoffs, startup, shutdown, etc. Appropriate triggers 314 may be developed to trap most any data or system event that may be of interest to any of the clients 370, 372, 374 and/or 376.

When an event (whether data or system-related) fires a trigger among the triggers 314, a notification is generated. The notification is published to the channel 315. The channel 315 may then utilize the registration information stored in the names schema 330 to propagate the notification to one or more of the notification clients 370, 372, 374 and/or 376. To publish the notification of a data or system event to the channel 315, the database 310 may push the notification to a memory space 340 that is shared between the database 310 and the event monitor 350. The event monitor 350 (a single event monitor 350 may be instantiated with each instance of the database 310) reads new event notifications from the shared memory space 340, and consults the names schema 330 to determine whether any of the subscriptions 320 have specified the event name corresponding to the published notification. If so, the channel 315 notifies all currently registered clients 370, 372, 374 and/or 376 that have subscribed to the event name corresponding to the published notification. To do so, the event monitor 350 retrieves the client registration information from the subset of the subscriptions 320 having specified the event name corresponding to the published notification from the names schema 330. This enables the channel 315 to not only identify which of the clients 370, 372, 374 and/or 376 have, via their agents, expressed an interest in receiving notifications of the type of event just published to the shared memory space 340, but also allows the channel 315 to retrieve the delivery information (e.g., host/port, for example) of those interested clients 370, 372, 374 and/or 376.

Thereafter, the channel 315 may send the notification to each of the clients 370, 372, 374 and/or 376 whose registration information (i.e., delivery information) has been retrieved from the names schema 330. This process may be termed "posting". To post an event notification to a client 370, 372, 374 and/or 376, the event monitor 350 may pass the delivery information for each client 370, 372, 374 and/or 376 whose subscription 320 specified the event name corresponding to the published event notification to a protocol engine 360. The protocol engine 360, according to an embodiment of the present invention, includes a process that sends a notification to appropriate clients 370, 372, 374 and/or 376 in the manner specified by the registration information in the names schema 330, as specified by the client 370, 372, 374 or 376 when the client 370, 372, 374 or 376 registered to receive notifications to the event. For example, the protocol engine 360 may send the notification to one or more of the clients 370, 372, 374 and/or 376 via one or more of any number of public protocols such as, for example, Hyper Text Transfer Protocol (http), File Transfer Protocol (ftp), Internet Interoperability Protocol (iiop), Simple Mail Transfer Protocol (smtp), Open Financial Exchange (OFX) and/or private protocols, such as Oracle Corporation's net8, for example.

Therefore, clients 370, 372, 374 and/or 376 may register to receive notifications relating to data and/or system events that are of interest to them, and have those notifications asynchronously delivered in the manner that is best suited to them. For example, a client process clients 370, 372, 374 and/or 376 may receive notifications of database events via http directly into a Web sit administered by the clients 370, 372, 374 and/or 376, or as a file transferred via ftp, for example, to a location specified by the client clients 370, 372, 374 and/or 376 upon registration.

The present invention, according to one embodiment thereof, may utilize queuing mechanisms wherein each event name maps onto a queue. Using queues, the clients 370, 372, 374 and/or 376 may subscribe and register to receive event notifications through their respective agents that, in this embodiment, may be thought of as logical persistent queue users. The agents, when subscribing to an event name, cause an entry to be made into the name schema. The agents, when publishing to an event name, insert a message into a queue referenced by the event name of interest to the client 370, 372, 374 or 376. The queuing mechanism allows the clients, through their agents, to express an interest in receiving particular notifications and proceed with their work, without waiting for a reply from the database 310, thereby implementing what may be characterized as a disconnected and deferred communication model. According to the present invention, when a trigger 314 fires, the database 310 for persistent queues, may enqueue the notification message into the queue referenced by the event name associated with the trigger that fired and write the notification message to shared memory 340. The event monitor 350 may then read the notification from the shared memory 340 and selectively propagate the notification toward the appropriate clients 370, 372, 374 and/or 376 using the registration information stored in the names schema 330 and the protocol engine 360. The clients 370, 372, 374 and/or 376 may thereafter dequeue the notification message at their convenience. For non persistent queues, the entire notification message may be written to shared memory 340 and thereafter propagated to the clients 370, 372, 374 and/or 376. According to an embodiment of the present invention, the Advanced Queuing protocol of Oracle Server 8.1 (or later versions) (hereafter Oracle AQ) may be advantageously implemented. Oracle AQ is described, for example, in Chapter 15 of *Oracle8 Server Concepts* incorporated herein above.

At the time of subscription and registration, the clients 370, 372, 374 and/or 376 may specify the quality of service desired for the database notifications. Within the context of the present invention, the phrase "quality of service" shall be deemed to include information as to whether the notification has been specified to be persistent or non-persistent. Persistent notifications include notifications that must be delivered to all interested clients 370, 372, 374 and/or 376 at or near the point in time (inasmuch as possible) at which the underlying event occurs, and the underlying client 370, 372, 374 and/or 376 performs an explicit dequeue operation to retrieve the message. Non persistent notifications deliver the message along with the notification. The clients 370, 372, 374 and/or 376, during the subscription and registration process, may specify the desired quality of service for each event in which they are interested in receiving notifications.

For example, a client 370, 372, 374 or 376 may subscribe to receive notifications from a stock ticker application that sends out frequent notifications, as stock prices change. Such notifications may be specified as non persistent, as the client 370, 372, 374 or 376 likely may not care if a few notifications are dropped within a short time interval because, for example, the system 300 is loaded and/or the shared memory 340 is full. Moreover, such client 370, 372, 374 or 376 may not care to receive stock price notifications if they are more than a few minutes old, for example. Such notifications messages may then be enqueued in a non-persistent queue and delivered on a best efforts basis to the subscribed clients 370, 372, 374 and/or 376 who are currently registered and dropped if non-deliverable within a specified time frame. Non-persistent queues, according to the present invention, include queues that do not persist beyond the instance of the database 310. The notification messages in non-persistent queues are preferably deleted after they have been delivered to the clients 370, 372, 374 and/or 376.

Alternately, a client 370, 372, 374 and/or 376 may subscribe and register to receive notifications of selected data and/or system events and specify that such notifications are to be persistent. For such notifications to be persistent, the notifications must be delivered exactly once to each subscribed client 370, 372, 374 and/or 376 that is currently registered, even in the presence of network, machine and application failures. To do so, the database 310 may enqueue the notification messages in a persistent queue referenced by the event name corresponding to the event of interest to the client. A persistent queue, according to an embodiment of the present invention, is a queue that persists beyond the instance of the database 310. If, for example, the shared memory 340 is full, persistent notifications may be written to the persistent storage 345 until such time as they may be rewritten to the shared memory 340 and delivered to the clients 370, 372, 374 and/or 376. The persistent storage 345 may include, for example, hard disk storage, tape storage, optical storage and/or some other storage means. At some later point in time, the notifications written to the persistent storage 345 may be delivered to the clients 370, 372, 374 and/or 376 who have subscribed for the persistent notifications and are still currently registered. Several events may have occurred, however, during the period in which the system 300 was loaded and/or the shared memory 340 was full. In that case, the clients 370, 372, 374 and/or 376 may wish to receive only the latest persistent notification, for example, Such delivery options for such notifications may be included in the client-specified registration parameters set upon registration.

An example of a reason for a full shared memory 340 is the case wherein the link between the channel 315 and the clients 370, 372, 374 and/or 376 includes relatively low bandwidth communications channels, such as telephone lines (POTS), for example. In this case, the event notifications may accumulate faster in the shared memory 340 than they can be delivered to the clients 370, 372, 374 and/or 376. Indeed, the link between the shared memory 340 and the database 310 may be several orders of magnitude faster than the link between the channel 315 and the clients 370, 372, 374 and/or 376, resulting in a bottleneck at the shared memory 340. In this case, it is particularly important for the clients 370, 372, 374 and/or 376 to specify the desired quality of service. Alternatively, the application itself may set the quality of service parameter. For example, the stock ticker application may itself set the quality of service parameter to unreliable to allow some flexibility in event notifications depending upon, for example, the current load on the system 300.

Queues, whether persistent or non-persistent, may be stored in queue tables within the database 310. A queue table is a database table and contains one or more queues. As such, the full functionality native to the database 310 is available to operate on the queue tables. Indeed, the clients 370, 372, 374 and/or 376 may take advantage of the full panoply of available database access expressions to evaluate rules based thereon over a single or multiple queue tables. For example, at the time of subscribing and registering to receive system and/or data notifications from the database 310, the clients 370, 372, 374 and/or 376 may also specify a rule to be evaluated before delivery of the associated notification occurs. Such a rule may contain database access language expressions such as, for example, SQL and/or PL/SQL statements (or other ANSI/ISO-compliant language expressions, for example) to access the notification message's properties, history and content. Alternatively, the rule may include a procedure (written in PL/SQL, for example) that calls an external procedure or function written in another programming language, such as the C programming language, for example. In this manner, even though a client 370, 372, 374 or 376 may have subscribed (through an agent) and registered to receive notifications concerning an event, delivery of the associated notification may not occur until the even occurs and the rule specified by the client at the time of subscribing and registering evaluates to TRUE or satisfies some other selected condition. As the notification is tightly integrated with the database 310, the full functionality native to the database 310 is brought to bear upon the generation and delivery of data and/or system event notifications to the clients 370, 372, 374 and/or 376. For example, notifications may be specified, at the time of subscription and registration, as available for delivery only after a specified time elapses (a delay time) and as having to be delivered before a specified time limit elapses. The client applications 370, 372, 374 and/or 376 may also specify, for example, that the notifications be stored after delivery, thereby keeping a history of relevant messages that may be used for tracking, data warehouse and data mining operations, for example.

Figure 4:
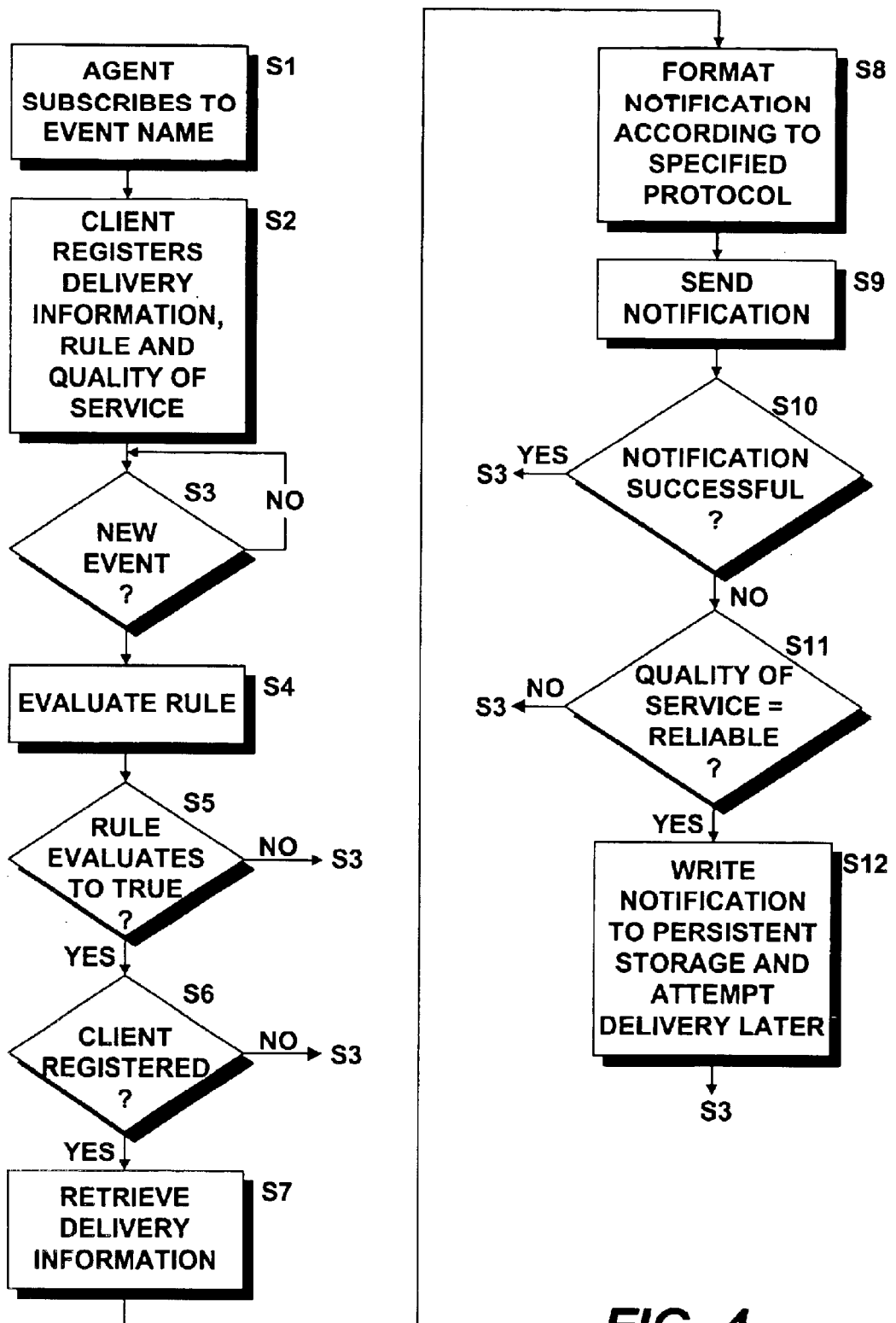
FIG. 4 is a flowchart of a method for asynchronous notification of database events, according to an embodiment of the present invention.

A functional example of a method for asynchronous notification of database event, according to the present invention, is shown in FIG. 4. As shown in step S1, an agent, acting on behalf of one or more of the clients 370, 372, 374 and/or 376 (which may include application programs and/or other entities) subscribers to an event name. That is, one or more of the client applications 370, 372, 374 and/or 376, acting through an agent, expresses an interest in receiving notifications when the even reference by the event name occurs in the database 310. In step S2, the client application (s) 370, 372, 374 and/or 376 registers the delivery information in the names schema 330 shown in FIG. 3. The delivery information may include the physical process where the client program runs (host and port information, for example) and may include a callback indicating the manner in which delivery of the notification should be made. Indeed, the delivery information registered in the names schema 330 includes sufficient information to allow the event monitor 350 and the protocol engine 360 to determine the place and manner of delivery of the event notifications. Quality of service information may also be specified at the time of registration, the client(s) 370, 372, 374 and/or 376 indicating whether the notifications are to be persistent or non persistent, as detailed above. Additionally, the clients 370, 372, 374 and/or 376 may, at the time of subscription, specify a rule that must evaluate to TRUE, for example, before an event notification may be delivered.

In step S3, it is determined whether a new data and/or system event has occurred for which one or more of the clients 370, 372, 374 and/or 376 has subscribed. According to the present invention, this determination may be made by the trigger(s) 314. As long as one of the triggers 314 does not fire, it may be concluded that no new data or system event of interest has occurred, and the method remains at step S3 until a new event of interest occurs. Upon the occurrence of a new event for which one or more of the clients 370, 372, 374 and/or 376 has subscribed, the rule (if any) specified by one or more of the clients 370, 372, 374 and/or 376 is evaluated, as shown in step S4. If the conditions coded in the rule specified in step S2 do not evaluate to TRUE or satisfy some other selected condition in step S5, the method may return to step S3, to resume detection of new data and/or system events. If, however, the conditions coded in the rule specified in step S2 evaluate to TRUE in step S5, the method proceeds to step S6, whereupon it is determined whether any of the client applications 370, 372, 374 and/or 376 who have expressed an interest in receiving notification through a subscription are currently registered, as shown in step S6. If non of the clients 370, 372, 374 and/or 376 who have (through an agent) subscribed to receive notifications of the event referenced by the event name are currently registered, the method of the present invention may revert back to step S3. If one or more of the clients 370, 372, 374 and/or 376 are currently registered, the delivery information specified upon registration is retrieved in step S7 and the notification is formatted according to the protocol (iiop, ftp, http, etc.) specified by the client(s) 370, 372, 374 and/or 376 upon registration, as shown in step S8. The properly formatted notification, in step S9, is then pushed out, or transmitted, to the client(s) 370, 372, 374 and/or 376. It is to be noted that a same notification may be sent to several different clients 370, 372, 374 and/or 376, each having specified a different rule and delivery information, rule and/or quality of service. Each of these client applications 370, 372, 374 and/or 376, in turn, may carry out different actions based upon the received notification. For example, should a notification of a system event such as a system shutdown be received by clients 370 and 372, client 370 may opt to do nothing because it is not currently accessing the database 310, whereas the client 372 process may save partial results, shut down in an orderly fashion and resume operations only after receiving notification that the database 310 is once again operational. By promoting inter-enterprise integration in this manner, notifications may be delivered to outside, disconnected client applications 370, 372, 374 and/or 376 over multiple protocols to allow the clients 370, 372, 374 and/or 376 to programmatically take some predetermined (e.g., corrective or preemptive) action.

If it is determined that the notification sent in step S9 was successful (such as by the receipt of an acknowledgement from each client 370, 372, 374 and/or 376 having registered to receive the notification), the method according to the present invention may revert back to step S3, to detect later-occurring data and/or system events. If, however, the notification sent in step S9 was not successfully sent, the method may proceed to step S11. The notification may not have been successfully sent if, for example, one of the communications lines between the protocol engine 360 and the clients 370, 372, 374 and/or 376 has been interrupted, such as may occur in the presence of a disruption in the network 380. Alternatively, or as a consequence of the failure of the communications lines between the clients 370, 372, 374 and/or 376 and the protocol engine 360, the shared memory buffer 340 may be full. Alternatively still, step S9 may have failed for any number of reasons not specifically enumerated herein. In any event, if the notification was not successfully sent, it may be determined, in step S11, whether the quality of service was specified as reliable or unreliable at the time of registration. If the quality of service was not specified as reliable, the method may revert back to step S3, it not being critical that the notification is successfully delivered. Other steps (not shown) may be taken to insure that at least some notifications are actually delivered to the registered client applications 370, 372, 374 and/or 376, inasmuch as is possible. If, however, the quality of service was specified as reliable, the notification may be written to the persistent storage 345 (such as a hard disk drive, optical memory, etc.). The undelivered notifications written to the persistent storage 345 may, at some later time, be written to the shared memory 340 and later retrieved therefrom by the event monitor 350. The event monitor 350 may then, in concert with the protocol engine 360, re-attempt delivery of the notification to the client(s) clients 370, 372, 374 and/or 376 having registered therefor. Additional filtering may occur prior to re-attempting delivery of the notifications stored in the persistent storage 345. For example, the client (s) 370, 372, 374 and/or 376 may be interested in receiving only the latest of a series of notifications relating to a given event name. The method may thereafter revert back to step S3, to continue the detection of event names for which subscriptions exist. It should be noted that the steps shown in FIG. 4 may be carried out in an order that is different than shown. For example, the determination of the quality of service may be made concurrently with step S7. Other sequences of steps are possible, and all such combinations are deemed to fall within the scope of the present invention.

HARDWARE OVERVIEW

Figure 5:
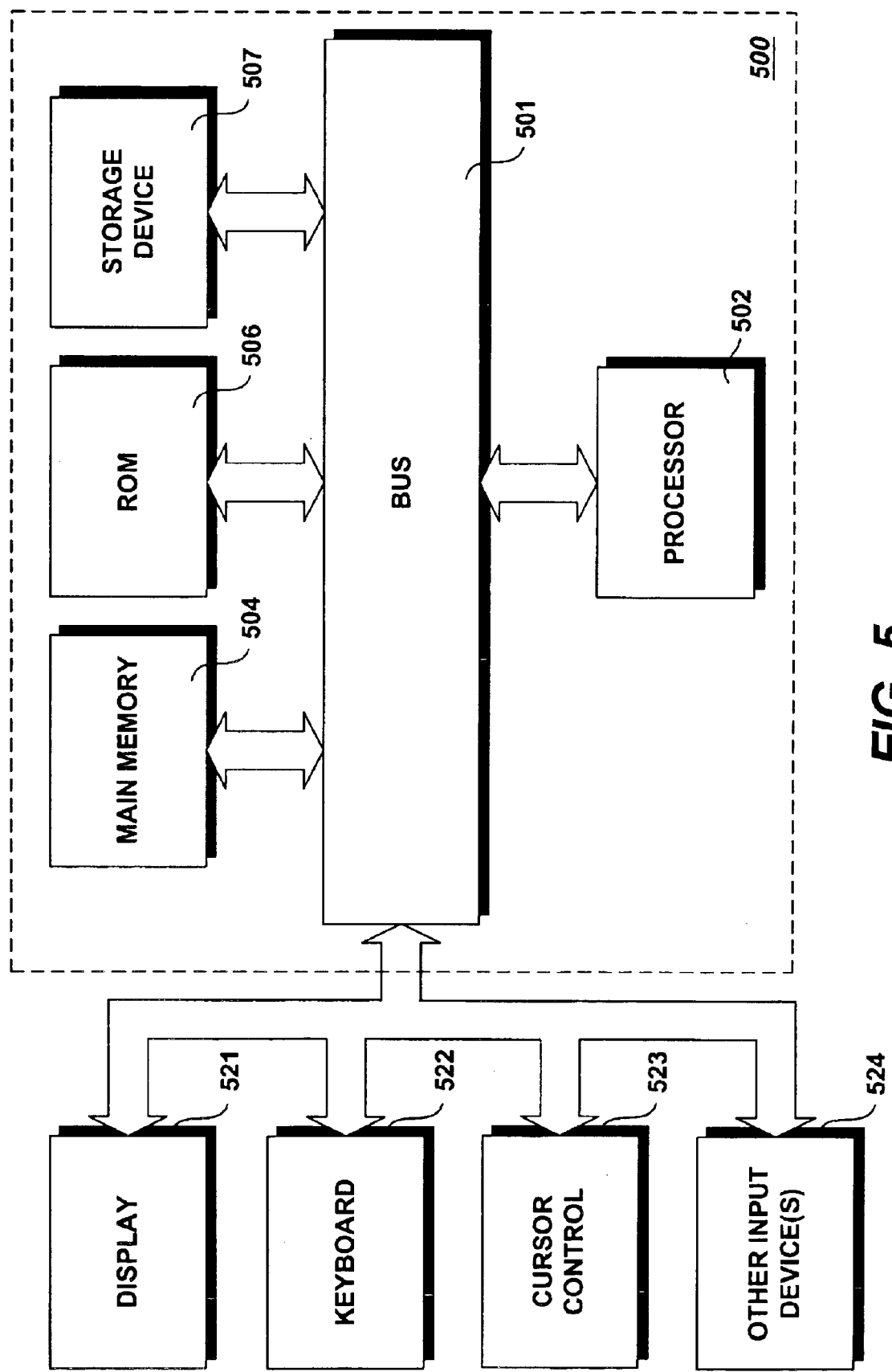
FIG. 5 illustrates a block diagram of a computer with which an embodiment of the present invention may be implemented.

FIG. 5 illustrated a block diagram of a computer 500 with which an embodiment of the present invention may be implemented. Computer system 500 includes a bus 501 or other communication mechanism for communicating information, and a processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also includes a read only memory (ROM) and/or other static storage device 506 coupled to bus 501 for storing static information and instructions for processor 502. A data storage device 507, such as a magnetic disk or optical disk, is coupled to bus 501 for storing information and instructions.

Computer system 500 may also be coupled via bus 501 to a display device 521, such as a cathode ray tube (CRT), for displaying information to a computer uses. An alphanumeric input device 522, including alphanumeric and other keys, is typically coupled to bus 501 for communicating information and command selections to processor 502. Another type of user input device is cursor control 523, such as a mouse, a trackball, or cursor direction keys for communicating direction information and command selections to processor 502 and for controlling cursor movement on display 521. This input device typically has two degrees of freedom in two axes, a first axes (e.g., x) and a second axis (e.g., y), which allows the device to specify positions in a plane. Alternately, a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 522 wherein all interface is provided via the stylus as a writing instrument (like a pen) and the written text is interpreted using optical character recognition (OCR) techniques.

The present invention is related to the use of computer system 500 to asynchronously notify client applications 370, 372, 374 and/or 376 of data and/or system event within the database 310. According to one embodiment, the methods according to the present invention are implemented by one or more computer systems 500 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. For example, notifications of events of interest may be disabled and later re-enabled by one or more application client clients 370, 372, 374 and/or 376. Moreover, events may be triggered not by some significant change in the data or the system, but by a user of the database 310. These events may also be trapped and notifications therefor may also be sent to one or more of the clients 370, 372, 374 and/or 376. Those of skill in this art will recognize other alternative embodiments and all such embodiments are deemed to fall within the scope of the present invention. Thus, the present invention should be limited only by the claims as set forth below.

What is claimed is:

1. A computer implemented method of asynchronously notifying an application client of an event of interest that occurs within a database, comprising the steps of:

receiving a subscription to an event name from a logical agent, the event name corresponding to the event of interest that occurs within the database;

receiving a registration from the application client, the registration including delivery information indicating at least where and how a notification concerning the event is to be delivered;

detecting an occurrence of the event within the database;

publishing the notification to a data structure referenced by the event name upon detecting the occurrence of the event;

retrieving the delivery information and formatting the published notification according to the retrieved delivery information, and asynchronously delivering the formatted notification to the application client over a network.

2. The computer implemented method of claim 1, wherein the detecting step is carried out by a trigger within the database, the trigger firing upon the occurrence of the event.

3. The computer implemented method of claim 1, wherein the delivery information includes an identification of a communication protocol according to which the formatted notification is to be sent.

4. The computer implemented method of claim 1, wherein the subscription includes a rule that must be satisfied for the notification to be published.

5. The computer implemented method of claim 4, wherein the rule includes database access language statements.

6. The computer implemented method of claim 1, wherein the data structure includes a queue, the queue being stored as a table in the database.

7. The computer implemented method of claim 1, wherein the retrieving step is carried out by an event monitor, the event monitor communicating with the database through a shared memory space.

8. The computer implemented method of claim 1, wherein the delivery information includes indicia of a quality of service specified by the application client, the quality of service indicia indicating whether the notification must be delivered to the application client.

9. The computer implemented method of claim 8, wherein a temporarily undeliverable notification may be dropped if the indicia indicates that an unreliable quality of service is specified and wherein the temporarily undeliverable notification must be stored if the indicia indicates that a reliable quality of service is specified.

10. The computer implemented method of claim 9, wherein the data structure includes a persistent queue when the indicia indicates that a reliable quality of service is specified, the persistent queue persisting beyond an instance of the database and wherein the data structure includes a non-persistent queue when the indicia indicates that an unreliable quality of service is specified.

11. The computer implemented method of claim 1, wherein the formatting step formats the notification according to a protocol selected from a group including Internet Inter-Orb Protocol (iiop), Hypertext Transfer Protocol (http), Simple Mail Transfer Protocol (smtp), File Transfer Protocol (ftp), net8 or Open Financial exchange (OFX).

12. The computer implemented method of claim 1, wherein the application client is remote from the database and separated therefrom by a network, and wherein the delivering step delivers the formatted notification to the remote application client over the network.

13. The computer implemented method of claim 12, wherein the network includes at least one the Internet, a private network, a public network and a hybrid network.

14. The computer implemented method of claim 1, wherein the event of interest includes one of a data event and a system event, the data event signaling a change of interest to the application client in a data resident in the database and the system even signaling a change of interest to the application client within the computerized system storing the database.

15. A machine-readable medium having data stored thereon representing sequences of instruction which, when executed by a computer, causes said computer to asynchronously notify an application client of an event of interest that occurs within a database by performing the steps of:
  receiving a subscription to an event name from a logical agent, the event name corresponding to the even of interest that occurs within the database;
  receiving a registration from the application client, the registration including delivery information indicating at least where and how a notification concerning the event is to be delivered;
  detecting an occurrence of the even within the database;
  publishing the notification to a data structure referenced by the event name upon detecting the occurrence of the event;
  retrieving the delivery information and formatting the published notification according to the retrieved delivery information, and
  asynchronously delivering the formatted notification to the application client over a network.

16. The machine-readable medium of claim 15, wherein the detecting step is carried out by a trigger within the database, the trigger firing upon the occurrence of the event.

17. The machine-readable of claim 15, wherein the delivery information includes an identification of a communication protocol according to which the formatted notification is to be sent.

18. The machine-readable medium of claim 15, wherein the subscription includes a rule that must be satisfied for the notification to be published.

19. The machine-readable medium of claim 18, wherein the rule includes database access language statements.

20. The machine-readable medium of claim 15, wherein the data structure includes a queue, the queue being stored as a table in the database.

21. The machine-readable medium of claim 15, wherein the retrieving step is carried out by an event monitor, the event monitor communicating with the database through a shared memory space.

22. The machine-readable medium of claim 15, wherein the delivery information includes indicia of a quality of service specified by the application client, the quality of service indicia indicating whether the notification must be delivered to the application client.

23. The machine-readable medium of claim 22, wherein a temporarily undeliverable notification may be dropped if the indicia indicates that an unreliable quality of service is specified and wherein the temporarily undeliverable notification must be stored if the indicia indicates that a reliable quality of service is specified.

24. The machine-readable medium of claim 23, wherein the data structure includes a persistent queue when the indicia indicates that a reliable quality of service is specified, the persistent queue persisting beyond an instance of the database and wherein the data structure includes a non-persistent queue when the indicia indicates that an unreliable quality of service is specified.

25. The machine-readable medium of claim 15, wherein the formatting step formats the notification according to a protocol selected from a group including iiop, http, smtp, ftp, Net8 or OFX.

26. The machine-readable medium of claim 15, wherein the application client is remote from the database and separated therefrom by a network, and wherein the delivering step delivers the formatted notification to the remote application client over the network.

27. The machine-readable medium of claim 26, wherein the network includes a least one the Internet, a private network, a public network and a hybrid network.

28. The machine-readable medium of claim 15, wherein the event of interest includes one of a data event and a system event, the data event signaling a change of interest to the application client in a data resident in the database and the system event signaling a change of interest to the application client within the computerized system storing the database.

29. A computer system for asynchronously notifying an application client of an event of interest that occurs within a database, said computer system comprising:
  at least one processor;
  at least one data storage device;
  a plurality of processes spawned by said at least one processor, the processes including processing logic for;
  receiving a subscription to an event name from a logical agent, the event name corresponding to the event of interest that occurs within the database;

receiving a registration from the application client, the registration including delivery information indicating at least where and how a notification concerning the event is to be delivered;

detecting an occurrence of the event within the database;

publishing the notification to a data referenced by the event name upon detecting the occurrence of the event;

retrieving the delivery information and formatting the published notification according to the retrieved delivery information, and asynchronously delivering the formatted notification to the application client over a network.

30. The computer system of claim 29, wherein the detecting step is carried out by a trigger within the database, the trigger firing upon the occurrence of the event.

31. The computer system of claim 29, wherein the subscription includes an identification of a communication protocol according to which the formatted notification is to be sent.

32. The computer system of claim 29, wherein the delivery information includes a rule that must be satisfied for the notification to be published.

33. The computer system of claim 32, wherein the rule includes database access language statements.

34. The computer system of claim 29, wherein the data structure includes a queue, the queue being stored as a table in the database.

35. The computer system of claim 29, wherein the retrieving step is carried out by an event monitor, the event monitor communicating with the database through a shared memory space.

36. The computer system of claim 29, wherein the delivery information includes indicia of a quality of service specified by the application client, the quality of service indicia indicating whether the notification must be delivered to the application client.

37. The computer system of claim 36, wherein a temporarily undeliverable notification may be dropped if the indicia indicates that an unreliable quality of service is specified and wherein the temporarily undeliverable notification must be stored if the indicia indicates that a reliable quality of service is specified.

38. The computer system of claim 37, wherein the data structure includes a persistent queue when the indicia indicates that a reliable quality of service is specified, the persistent queue persisting beyond an instance of the database and wherein the data structure includes a non-persistent queue when the indicia indicates that an unreliable quality of service is specified.

39. The computer system of claim 29, wherein the formatting step formats the notification according to a protocol selected from a group including iiop, http, smtp, ftp, Net8 or OFX.

40. The computer system of claim 29, wherein the application client is remote from the database and separated therefrom by a network, and wherein the delivering step delivers the formatted notification to the remote application client over the network.

41. The computer system of claim 40, wherein the network includes at least one the Internet, a private network, a public network and a hybrid network.

42. The computer system of claim 29, wherein the event of interest includes one of a data event and a system event, the data event signaling a change of interest to the application client in a data resident in the database and the system event signaling a change of interest to the application client within the computerized system storing the database.

* * * * *

UNITED STATES PATENT AND TRADEMARK OFFICE
CERTIFICATE OF CORRECTION

PATENT NO. : 6,910,070 B1
DATED : June 21, 2005
INVENTOR(S) : Shallendra K. Mishra and Lakshminaravanan Chidambaran It is certified that error appears in the above-identified patent and that said Letters Patent is hereby corrected as shown below:

Title page,
Item [57], ABSTRACT,
Line 19, replace "notification" with -- notifications --.

Column 13,
Lines 46, 55 and 61, replace "even" with -- event --.
Line 50, replace "instruction" with -- instructions --.

Column 14,
Line 6, after "machine-readable", insert -- medium --.

Column 15,
Line 6, after "data", insert -- structure --.

Signed and Sealed this

Thirtieth Day of August, 2005

JON W. DUDAS
*Director of the United States Patent and Trademark Office*